United States Patent Office 2,835,635
Patented May 20, 1958

2,835,635
CORROSION INHIBITING COMPOSITIONS

Raymond L. Mayhew, Phillipsburg, N. J., and Charles F. Jelinek, Delmar, N. Y., assignors to General Aniline & Film Corporation, New York, N. Y., a corporation of Delaware No Drawing. Application November 1, 1956
Serial No. 619,677

6 Claims. (Cl. 252—57)

The present invention relates to rust preventing compoitions suitable for protecting metal surfaces.

It is known that not only moisture but corrosive fluids, gases, etc. readily attack metallic surfaces and cause corrosion, rusting, and other damage to such surfaces. This problem is serious where liquid petroleum hydrocarbons are employed, such as, for example, lubricating oils in internal combustion engines, diesel engines, aircraft engines, turbines and various other machinery and industrial equipment. The damage thus caused is not to the metal surface alone, for rust particles frequently break off and enter the circulating system of engines and cause plugging, clogging and fouling of conduit lines, columns, and the like, are very susceptible to corrosion and must be protected.

To protect metal surfaces in contact with corrosive contaminants with a composition which is stable and readily miscible with liquid petroleum hydrocarbons constitutes one of the principal objects of the present invention.

Another object is to form film-forming metal protective compositions which possess lubricating properties.

A further object is to provide an oily rust preventing composition comprising a liquid petroleum hydrocarbon having incorporated therein an active rust inhibiting ingredient.

Other objects and advantages of the invention will become more clearly manifest from the following description.

We have found that various metals subject to rusting and corrosive influences when in contact with liquid petroleum hydrocarbons whether crude or refined can be protected from such influences by incorporating into the liquid petroleum hydrocarbon a rust inhibiting amount of at least one ester of tris-hydroxy methylbenzene having the following general formula:

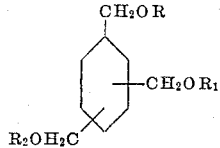

wherein R, $R_1$ and $R_2$ are either hydrogen or an acyl group containing from 5 to 40 carbon atoms, and wherein at least one of the R's is an acyl group, such as, caproyl, caprylyl, capryl, lauroyl, myristoyl, palmitoyl, stearoyl, γ-hexenoyl, oleoyl, linoleoyl, linoloyl, elaidoyl, erucoyl, stearoloyl, abietoyl and the like. The nature or character of the acyl group, i. e. whether saturated or unsaturated, branched or unbranched is immaterial so long as it contains at least 5 carbon atoms.

The compounds characterized by the foregoing general formula are readily prepared in the conventional manner by the reaction of trimerized propargyl alcohol, which is a mixture of 1,2,4- and 1,3,5-trimethylolbenzenes, with 1, 2 or 3 molar ratios of an acyl halide, in the presence of pyridine or similar acid acceptors.

The trimerized propargyl alcohol is obtained in the usual manner by heating an aqueous solution of propargyl alcohol with Raney nickel for about thirty hours. The resulting product consists of a mixture of essentially equal parts of 1,3,5-trimethylolbenzene and 1,2,4-trimethylolbenzene. In view of this mixture any mono-, di-, or triesters of the mixtures of trimethylolbenzenes will be characterized by the following general formula:

(1) 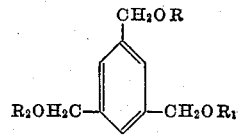

(Esters of 1,3,5-trimethylolbenzene)

(2) 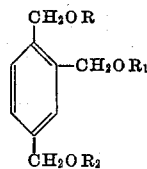

(Esters of 1,2,4-trimethylolbenzene)

The acyl halides which may be used are those that are derived from the following acids: Caproic, isocaproic, diethylacetic, enanthic, δ-methylhexylic, caprylic, ε-methylheptylic, dipropylacetic, pelargonic, ζ-methyloctylic, capric, n-methylnonylic, isoamylisopropylacetic, undecylic ε-methyldecylic, di-tert.-butylmethylacetic, lauric, diisoamylacetic, tridecylic, myristic, pentadecylic, palmitic, di-n-heptylacetic, margaric, stearic, di-n-octylacetic, nondecylic, arachidic, behenic, tetracosanic, cerotic, melissic, dicetylacetic, α-ethylcrotonic, teracrylic, δ-citronellic, ε-undecylenic, oleic, elaidic, erucic, brassidic, sorbic, stearolic, linolic, behenolic, abietic, pimaric, camphoric and the like.

In addition to the foregoing acids, tall oil acid, hydrogenated tall oil acids, naphthenic acids, abietic acids; alkyl benzoic acids such as dodecylbenzoic acid, nonylbenzoic acid, octylbenzoic acid; acids from oxo alcohols and aldehydes; acids from oxidized petroleum fractions; acid mixtures from various natural plant and animal oils such as olive, tallow, palmitic, castor, peanut, coconut, soybean, cottonseed, ucuhuba, linseed; fish oils such as cod, herring, menhaden, etc.; neat's-foot, sperm, palm, corn, butter, babassu, kapok, hempseed, mustard, rubberseed, rape, safflower, sesame, etc. may also be employed.

In addition to being useful as the principal ingredient in corrosion inhibiting compositions all of the esters of trishydroxymethylbenzenes characterized by the above formula are adaptable for many new and useful purposes in the industrial arts. The most conspicuous property of these new esters is their great activity at surfaces and interfaces which promotes their use in a large field of the technical arts. For instance, they can be used as wetting, frothing, or washing agents in the treating and refining of textiles; for converting liquid or solid substances which per se are insoluble in water (such as hydrocarbons, higher alcohols, oils, fats, waxes and resins) into creamy emulsions, clear solutions or fine, stable dispersions; for carbonizing; for dyeing; for the pasting of dyestuffs; for filling, sizing, impregnating and bleaching treatments; as cleansing agents in hard water; in tanning and mordanting processes; for dyeing acetate with insoluble dyestuffs; for the preparation of dyestuffs in finely divided form; for producing foam in fire extinguishers; as a means for improving the absorption power of fibrous bodies; and as an aid in softening baths for hides and skins.

In addition, these esters are valuable emulsifiers for insecticide compositions and agricultural sprays such as DDT, 2,4-D, Toxaphene, Chlordane, dormant or mineral oil sprays, nicotine sulfate, Dieldrin, Aldrin, Lindane, BHC, Heptachlor I. P. C., Chloro I. P. C., Methoxychlor, etc. They are also valuable for use as additions to petroleum products, as additives for fuel oils, hydraulic fluids, lubricating oils, cutting oils, greases, as additives to the water or brine used for oil recovery from oil-bearing strata by flooding techniques.

Other valuable uses are in metal cleaning compositions, dry cleaning compositions, additives for rubber latices, foam inhibitors for synthetic rubber latex emulsions, froth flotation agents, additives for road building materials, as air entraining agents for concrete or cement, additives to asphalt compositions, plasticizers and modifiers for vinyl plastics, alkyl resins, phenol-formaldehyde resins, and other types of polymeric-type plastic materials, for incorporation into adhesives, paint, linoleum, for use in bonding agents used in various insulating and building materials, as refining aids in wood digesters to prepare pulp, as additives to pulp slurries in beating operations to prevent foaming and also to aid in the beating operation in papermaking.

These esters are useful as emulsifiers for emulsion polymerization, as mercerizing assistants, wetting agents, rewetting agents, dispersing agents, detergents, penetrating agents, softening agents, cutting oils, lime soap dispersants, dishwashing agents, anti-static agents, disinfectants, insecticides, moth-proofing agents, bacteriocides, fungicides and biocides.

They are valuable as anti-fogging agents for use on glass and other surfaces where the accumulation of an aqueous fog is detrimental. They are useful in the rayon industry as additives to the dope and as aids in clarifying viscose rayon. They are of value in hydraulic fluids.

These esters are especially useful in breaking petroleum emulsions. They may be used to break emulsions of crude petroleum and salt water as obtained from oil wells by introducing the agent into the well, or to break or prevent emulsions which would result from a water flooding process for recovering oil from oil-bearing strata. They may also be used to break emulsions encountered in a petroleum refining process.

They are useful as rust inhibitors, in the protection of metals especially ferrous metals, in acid pickling baths, in acid cleaning compositions, and in electro-plating baths.

Other valuable uses are as solvents, as cleaning agents for paint brushes, as additives for paints, lacquers, and varnishes, as lubricants, as greases, and stuffing agents.

These esters are valuable in the preparation of skin creams, lotions, salves and other cosmetic preparations such as home hair-wave sets, shampoos, toothpastes, etc. They may be of value in food products as foaming agents, emulsifying agents, and softening agents.

The corrosion inhibiting compositions utilized in accordance with the present invention are employed in all liquid petroleum hydrocarbons and mixtures thereof having a boiling range from 50° C. to 500° C. and include gasolines, kerosene, gas oils, petroleum naphtha, and petroleum naphtha cuts, mineral spirits, mineral seal oil, benzene, cumene, butylbenzene, paraffines, e. g. hexane, octane, nonane, decane, etc. and mixtures thereof, cycloparaffines, e. g. cyclohexane, isopropyl cyclohexane, n-butyl cyclohexane, etc. and mixtures thereof, chlorinated kerosene, transforming oils, diesel oil, cutting oils, lubricating oils, and the like, whether in the crude or refined form. The esters of tris-hydroxybenzene characterized by the foregoing general formulae and mixtures of such compounds are soluble in all of the aforementioned liquid petroleum hydrocarbons to the extent of rust inhibiting amounts which range from 0.5 to 5% by weight of the liquid petroleum hydrocarbon.

The rust inhibiting components are incorporated into the liquid petroleum hydrocarbon in rust inhibiting amounts of the aforestated range, and the mixture heated from 30° C. to 80° C. for convenience, especially in the case of the more viscous solvents, so as to obtain a stable solution. Such mixture exhibits outstanding rust inhibition in the presence of steel drums, storage tanks, and in the presence of ferrous and steel metals under severe rust producing environment as will be noted from the following working examples.

The unusual feature of the rust additives utilized in accordance with the present invention is that when used with gasolines, diesel oils and other fuels for internal combustion engines, they leave no residue upon ignition.

The following examples are illustrative of the manner in which the present invention may be practiced. It is to be clearly understood that these examples are simply illustrative and are not to be intended as limiting the scope of the invention claimed.

EXAMPLE I

*Trimethylolbenzene monooleate*

In a 500 cc. 4-neck flask equipped with a stirrer, thermometer, condenser, and dropping funnel was placed 168.2 grams of trimethylolbenzenes and 100.0 ml. of dry pyridine. The flask was then cooled in a cold water bath to 20° C. and 60.1 grams of oleic acid chloride was added through the dropping funnel. The addition was made over a period of 1½ hours at 20–30° C. with strong agitation. The stirring was continued for 16 hours at 28–30° C. At the end of this time the contents of the flask were washed with 5% sodium chloride solution until neutral and then dried by heating to 95° C. at 10 mm. A small amount of residual salt was filtered off. The final product, a dark amber liquid, weighed 70.0 grams (80.9% yield) and was soluble in 65/75 Saybolt mineral oil, n-octane and high boiling petroleum ether. Free acid calculated as oleic=9.6%. Saponification number found 135.0 mg. KOH/gram. Saponification number calculated 129.7 mg. KOH/gram.

A. The foregoing ester was tested as a rust inhibitor according to the method of Baker, Jones and Zisman (Ind. Eng. Chem., 40, 2338 (1948) and 41, 137 (1949)) as follows:

2% and 0.5% solutions by weight of the ester were prepared using crankcase type lubricating oil, initial boiling point 375° C., as the solvent. Clear solutions resulted. As described in the above reference to Baker and Zisman, the mild steel shaped test specimens were submerged in the above mentioned solutions of the product, brought to 60° C. and after one hour, a drop of distilled water was added in contact with the steel to each system. At the end of 48 hours the test specimens were inspected. No stain or rust was evident.

In a similar experiment using no additive to the oil, the test specimen becomes rusty in a very short time and after the duration of 48 hours much rusting was evident.

B. The same ester was also tested as follows:

2% and 0.5% by weight solutions were made of the product in lubricating oil as in the previous example, and also in high boiling petroleum ether (boiling range 90–100° C.). Into each solution were allowed to fall chips produced by turning a suitable piece of C–1018 steel in a lathe and cutting with a high speed steel tool equipped with ground in chip breaker. After a reasonable number of chips had been so collected, the solutions were drained by decantation until most of the solutions were removed, and only sufficient remained to wet the chips.

The systems thus prepared were placed in the corrosive environment which cycled periodically through 100% relative humidity between 55° and 60° C. After two weeks none of the test specimens showed visible signs of rust except 0.5% in petroleum ether when a trace of rust was evident. This was considered an exhibition of rust inhibition since the uninhibited petroleum ether and the oil allow rust in a matter of a few minutes to a few hours under the same circumstances.

EXAMPLE II

Trimethylolbenzene dioleate

In a 500 cc. 4-neck flask equipped with a stirrer, thermometer, condenser, and dropping funnel were placed 33.6 grams of trimethylolbenzenes and 100.0 ml. of dry pyridine. Stirring was started and 120.3 grams of oleic acid chloride was added through the dropping funnel at 36°–54° C. over a period of 1½ hours. The temperature was then raised from 50 to 70° C. and held for three hours. The contents of the flask were then cooled to 30° C. and washed with 250.0 ml. of water. The lower layer was drawn off and 200.0 ml. of benzene was added to the product layer and washed with 5% sodium chloride solution until neutral. The product was dried by heating to 95° C. at 30 mm. and a small amount of residual salt filtered off. The final product, a dark amber liquid, weighing 135.0 grams (96.9% yield) and was soluble in 65/75 Saybolt mineral oil and high boiling petroleum ether. Saponification number found 175 mg. KOH/gram. Saponification number calculated 161.0 mg. KOH/gram. Free acid calculated as oleic acid=0.3%.

The resulting product was tested as follows:

2% and 0.5% solutions by weight were prepared in petroleum ether. Clear solutions resulted. Into each of these were allowed to fall chips of C1018 steel and testing proceeded as in the Example I above. At the end of one day in the corrosion environment no rust was evident. At the end of four days slight rusting was evident in the case of the 2% solution, and greater rusting in the case of the 0.5% solution. After eight days no additional rusting was evident in the case of the 2% solution, but pronounced rusting was evident in the case of the 0.5% solution. In contrast to this, the uninhibited petroleum ether allowed rusting to occur in less than a few hours under the same circumstances.

EXAMPLE III

Trimethylolbenzene trioleate

In a 500 cc. 4-neck flask equipped with a stirrer, thermometer, condenser, and dropping funnel was placed 56.6 grams of trimethylolbenzenes and 300.0 ml. of dry pyridine. Stirring was started and 300.0 grams of oleic acid chloride was added through the dropping funnel at 20°–50° C. over a period of 2 hours. The temperature was then raised to 80° C. and held at 70–80° C. for 4½ hours. The contents of the flask was then cooled to 30° C. 200.0 ml. of water and 200.0 ml. of benzene was added and the lower layer drawn off and discarded. The upper layer was washed twice with 300.0 ml. of 10% Na$_2$CO$_3$ solution and finally washed with an ethanol-water solution. The product was dried by heating to 95° C. at 30 mm. and a small amount of residual salt filtered off. The dark liquid product weighed 289.0 grams (90.2% yield). Saponification number found 170.7 mg. KOH/gram. Saponification number calculated 175.1 mg. KOH/gram. Free COOH found 0.33%.

The resulting product was tested as follows:

2% and 0.5% solutions by weight were prepared in crankcase type lubricating oil. Clear solutions resulted. These were subjected to the Baker-Zisman static drop test as described in Example A above. At the end of the 48 hour period at 60° C. no rust was visible in the case of the 2% solution; rust occurred in the case of the 0.5% solution. The uninhibited oil allows rust in a very short time.

The product was also tested in the manner of B above. At the end of six days in the corrosive environment only slight rusting was observable in any case, the 0.5% solution in oil showing the most but still being considered good; the uninhibited solvents allow rusting to occur in very short times.

EXAMPLE IV

Tall oil monoester of trimethylolbenzene

In a 500 cc. 4-neck flask equipped with a stirrer, thermometer, condenser and dropping funnel was placed 168.2 grams of trimethylolbenzenes and 150.0 ml. of dry pyridine. Stirring was started and 95.3 grams of fractionated tall oil acid chloride was added through the dropping funnel at 29–33° C. over a period of 5 hours. The stirring was continued for an additional hour and then the lower layer was drawn off. The upper layer was washed until neutral with 5% sodium chloride solution. The product was dried by heating to 95° C. at 30 mm. and a small amount (less than ½ gram) of salt was filtered off. Saponification number found 119.9 mg. KOH/gram. Saponification number calculated 134.6 mg. KOH/gram. Free acid calculated as oleic acid=11.8%.

The resulting compound was tested in the manner of A above. Both the 2% and the 0.5% solutions in the oil were slightly cloudy. Both the 0.5% solution and the 2% solutions allowed no rust to occur for at least 48 hours at 60° C. Uninhibited oil under the same circumstances allowed rust to occur in a very short time.

This compound was also tested in the manner of B above. Again the solutions in the oil were slightly cloudy. Both the 2% and the 0.5% solutions in petroleum ether were clear.

In the case of the solutions in petroleum ether, the test turnings had rusted to no visible extent at the end of a 24 hour period in the corrosive environment at either concentration. However, after three days slight rusting was apparent. In the case of the solutions in oil, no visible rust was evident at the end of a seven day period at either the 0.5% or the 2% solution and the inhibition of rusting was judged excellent. The uninhibited solvents allow rusting in a matter of minutes or hours.

EXAMPLE V

Trimethylolbenzene monolaurate

In a 500 ml. flask equipped with a stirrer, thermometer, condenser and dropping funnel was placed 168.2 grams of trimethylolbenzenes and 100.0 ml. of dry pyridine. The flask was cooled in a cold water bath at 29° C. and 87.4 grams of lauroyl chloride was added through the dropping funnel at 29–32° C. over a period of 50 minutes. The reaction mixture was held at this temperature for an additional hour and then washed and dried. Saponification number found 175 mg. KOH/gram. Saponification number calculated 160.1 mg. KOH/gram. Free acid calculated as lauric acid=7.3%.

This compound was tested in the manner of Example A above. Both the 2% and the 0.5% solution in the oil were cloudy. Both of these compositions passed the Baker-Zisman test in that no rust appeared on the test specimen after 48 hours. Untreated oil allows rust to occur after but a few hours.

This compound was also tested in the manner of Example B above. While the oil solutions were cloudy, the solutions in the petroleum ether were clear.

In the case of the oil solutions, the chips did not rust for a period in excess of one week. In the case of the 2% solution in petroleum ether, there was slight rusting in the same period, and in the case of the 0.5% solution, slight rusting was evident after three days.

EXAMPLE VI

Trimethylolbenzene dilaurate

In a manner similar to Example II trimethylolbenzene dilaurate was prepared. This compound was found to be an excellent rust inhibitor when tested in Soltrol 170 (a commercially available hydrocarbon having a boiling range of 420–475° F.—Phillips) according to test B.

EXAMPLE VII

*Trimethylolbenzene trilaurate*

In a manner similar to Example III trimethylolbenzene trilaurate was prepared. This compound was found to be an excellent rust inhibitor when tested in Soltrol 130 (Phillips — 99.4% paraffinic - naphthenic hydrocarbon, boiling range 335–410° F.) according to test B.

EXAMPLE VIII

*Trimethylolbenzene monostearate*

In a manner similar to Example I trimethylolbenzene monostearate was prepared. This compound was found to be an excellent rust inhibitor when tested in Carnation white mineral oil (specific gravity at 60° F. 0.835/0.845; Saybolt viscosity at 100° F. 65/75) according to test B.

EXAMPLE IX

*Trimethylolbenzene monolinoleate*

In a manner similar to Example I trimethylolbenzene monolinoleate was prepared. This compound was found to be an excellent rust inhibitor when tested in Soltrol 150 (Phillips—commercially available hydrocarbon having a boiling range of 350–445° F.) according to test B.

EXAMPLE X

*Trimethylolbenzene monopalmitate*

In a manner similar to Example I trimethylolbenzene monopalmitate was prepared. This compound was found to be an excellent rust inhibitor when tested according to the procedure of test B.

Various other modifications and variations will be obvious to a person skilled in the art and it is to be understood that such modifications and variations are to be included in the purview of the application and the spirit and scope of the appended claims.

We claim:

1. A corrosion inhibiting composition comprising a major proportion of a liquid hydrocarbon having a boiling point of 50° to 500° C. and a corrosion inhibiting amount of at least one ester of tris-hydroxymethylbenzene having the following general formula:

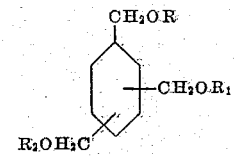

wherein R, $R_1$ and $R_2$ are selected from the group consisting of hydrogen and acyl groups containing from 5 to 40 carbon atoms, and wherein at least one of the R's is an acyl group.

2. A corrosion inhibiting composition according to claim 1 wherein the ester of tris-hydroxymethylbenzene is tri-methylolbenzene monooleate.

3. A corrosion inhibiting composition according to claim 1 wherein the ester of tris-hydroxymethylbenzene is tri-methylolbenzene dioleate.

4. A corrosion inhibiting composition according to claim 1 wherein the ester of tris-hydroxymethylbenzene is tri-methylolbenzene trioleate.

5. A corrosion inhibiting composition according to claim 1 wherein the ester of tris-hydroxymethylbenzene is tall oil monoester.

6. A corrosion inhibiting composition according to claim 1 wherein the ester of tris-hydroxymethylbenzene is monolaurate.

References Cited in the file of this patent

UNITED STATES PATENTS

| | | |
|---|---|---|
| 2,282,557 | Bruson | May 12, 1942 |
| 2,309,335 | Bruson | Jan. 26, 1943 |
| 2,607,746 | Magoffin | Aug. 19, 1952 |